(12) United States Patent
Yamaguchi et al.

(10) Patent No.: US 6,450,573 B1
(45) Date of Patent: Sep. 17, 2002

(54) ANTI-SUBMARINE VEHICLE SEAT DEVICE

(75) Inventors: Hiroyoshi Yamaguchi; Hajime Shono, both of Yokohama (JP)

(73) Assignee: NHK Spring Co., Ltd. (JP)

( * ) Notice: Subject to any disclaimer, the term of this patent is extended or adjusted under 35 U.S.C. 154(b) by 0 days.

(21) Appl. No.: 09/525,994

(22) Filed: Mar. 15, 2000

(30) Foreign Application Priority Data

| Mar. 15, 1999 | (JP) | 11-067669 |
| Mar. 15, 1999 | (JP) | 11-068356 |
| Mar. 26, 1999 | (JP) | 11-082799 |
| Mar. 26, 1999 | (JP) | 11-082802 |

(51) Int. Cl.[7] ............................................... B60N 2/42
(52) U.S. Cl. ................................................. 297/216.1
(58) Field of Search ...................... 297/216.1, 284.11, 297/284.1

(56) References Cited

U.S. PATENT DOCUMENTS

| 3,591,232 A | 7/1971 | Simon ...................... 297/216.1 |
| 3,858,930 A | 1/1975 | Calandra et al. ............ 296/68.1 |
| 4,623,192 A | 11/1986 | Koide et al. ......... 297/284.11 X |
| 4,652,049 A | 3/1987 | Maruyama et al. .. 297/284.11 X |
| 4,705,296 A | 11/1987 | Andersson et al. .......... 280/806 |
| 4,767,155 A * | 8/1988 | Kousaka et al. |
| 5,186,494 A | 2/1993 | Shimose ...................... 280/806 |
| 5,340,185 A * | 8/1994 | Vollmer |
| 5,374,105 A | 12/1994 | Kracht et al. ............. 297/216.1 |
| 5,403,037 A | 4/1995 | Föhl ........................... 280/806 |
| 5,405,180 A | 4/1995 | Föhl ........................... 297/478 |
| 5,449,214 A | 9/1995 | Totani ......................... 296/68.1 |
| 5,451,094 A | 9/1995 | Templin et al. ........... 297/216.7 |
| 5,490,706 A | 2/1996 | Totani ......................... 296/68.1 |
| 5,556,160 A | 9/1996 | Mikami .................... 297/216.1 |
| 5,647,635 A * | 7/1997 | Aumond et al. |
| 5,695,242 A | 12/1997 | Brantman et al. ....... 297/216.1 |
| 5,908,219 A | 6/1999 | Bohmler .............. 297/216.1 X |
| 6,050,635 A * | 4/2000 | Pajon et al. |
| 6,113,185 A | 9/2000 | Yamaguchi et al. ..... 297/216.1 |

FOREIGN PATENT DOCUMENTS

| DE | 3841688 A | 6/1990 |
| DE | 4423957 A | 1/1996 |
| DE | 19707998 A | 9/1998 |
| EP | 0 306 299 A1 | 3/1989 |
| EP | 0965479 A | 12/1999 |
| GB | 2330334 A | 4/1999 |

(List continued on next page.)

OTHER PUBLICATIONS

Patent Abstracts of Japan, Publication No. 05229378 http://www.2.ipdl.jpo-miti.go.jp/dbpweb/connecter/guest/DB-Pquery/ENGDB/wdispaj.
Patent Abstracts of Japan, Publication No. 07081466 http://www.2.ipdl.jpo-miti.go.jp/dbpweb/connecter/guest/DB-Pquery/ENGDB/wdispaj.
Combined Search and Examination Report under Sections 17 and 18(3) dated June 27, 2000 for Great Britain Application Serial No:GB0005953.5 (5 pages).

*Primary Examiner*—Milton Nelson, Jr.
(74) *Attorney, Agent, or Firm*—Skjerven Morrill MacPherson LLP

(57) ABSTRACT

Provided is a vehicle seat device equipped with an anti-submarine vehicle seat device for preventing submarine at the time of an impact without increasing the size and weight of the seat assembly. The casing and/or the restraint member serve the dual purposes as structural members for the seat frame so that the overall amount of the material for the structural members can be reduced.

8 Claims, 4 Drawing Sheets

FOREIGN PATENT DOCUMENTS

| | | | |
|---|---|---|---|
| GB | 2337726 A | 12/1999 | |
| GB | 2342076 A | 4/2000 | |
| JP | 58-53525 | 3/1983 | |
| JP | 1275230 | * 11/1989 | |
| JP | 2-149328 | 12/1990 | |
| JP | 3-61440 | 6/1991 | |
| JP | 3-227745 | 10/1991 | |
| JP | 3-121947 | 12/1991 | |
| JP | 4-93222 | 8/1992 | |
| JP | 5-229378 | 9/1993 | |
| JP | 7-81466 | 3/1995 | |
| JP | 10-181529 | 7/1998 | |

* cited by examiner

ANTI-SUBMARINE VEHICLE SEAT DEVICE

CROSS REFERENCE TO RELATED APPLICATIONS

Copending U.S. patent application Ser. No. 09/334,116 filed Jun. 15, 1999, and three commonly assigned U.S. patent applications of even date are directed to similar subject matters, and the contents of these applications are incorporated herein by reference.

TECHNICAL FIELD

The present invention relates to a vehicle seat device, and in particular to a vehicle seat device equipped with an anti-submarine vehicle seat device for preventing a vehicle occupant from slipping forward under the seat belt in case of an impact situation such as a vehicle crash.

BACKGROUND OF THE INVENTION

It is known that the so-called submarine phenomenon may occur in an impact situation such as a vehicle crash by the vehicle occupant slipping forward under the seat belt and the waist belt failing to restrain the pelvis of the vehicle occupant. This is prone to occur when the vehicle occupant sits in the front end of the seat or when the back rest is tilted rearward, and reduces the effectiveness of the seat belt in restraining the vehicle occupant or prevents the desired parts of the vehicle occupant to be restrained.

Therefore, it is conceivable to raise the front end of the seat by providing a projection in a front end of the seat frame, or by installing a panel in a front end of the seat frame. However, a desired effect in preventing submarine may not be achieved if the projection or the panel is too low, and the comfort of the vehicle occupant may be impaired if it is too low.

Accordingly, it has been previously proposed to raise the front end of the seat only in case of an impact. Such proposals include those using an air bag (Japanese Patent laid-open (kokai) publications No. 5-229378, No. 7-81466, and No. 3-227745), those which mechanically raise the front end of the seat (Japanese UM laid-open (kokai) publications No. 2-149328, No. 3-121947, and No. 4-93222), and those using a pyrotechnic actuator to mechanically raise the front end of the seat (Japanese UM laid-open (kokai) publication No. 3-61446).

However, because such anti-submarine devices involve generation of a large force, the structure of the device is required to have a high mechanical strength, and this prevents a compact and light-weight design of the seat.

BRIEF SUMMARY OF THE INVENTION

In view of such problems of the prior art, a primary object of the present invention is to provide an anti-submarine device which allows a compact and light-weight design of the seat while ensuring a sufficient mechanical strength to withstand the reaction of the actuator of the anti-submarine seat device at the time of actuation.

A second object of the present invention is to provide a low profile anti-submarine seat device which would not impair the sitting comfort and support capability of the seat.

A third object of the present invention is to provide an anti-submarine seat device which is economical and easy to manufacture.

According to the present invention, such objects can be accomplished by providing a vehicle seat device for raising a front part of a seat member to prevent a vehicle occupant from slipping forward under a seat belt in an impact situation such as a vehicle crash, comprising: a fixed casing; a vehicle occupant restraint member supported by the casing so as to be moveable between a rest position and a deployed position; and a power actuator supported by the casing for selectively driving the restraint member toward the deployed position; the fixed casing and/or the restraint member forming at least a part of a structural member of a seat frame.

Thus, the casing and/or the restraint member serve the dual purposes as structural members, and the overall amount of the material for the structural members can be reduced. This results in the reduction in the size and weight of the overall seat arrangement. Typically, the casing forms a side member of the seat frame, and has a front end which pivotally supports the restraint member, the seat frame having a rectangular configuration defined by the side member, a rear cross member, another side member opposing the side member, and the restraint member extending across front ends of the side members. The restraint member preferably consists of a pipe member or any other stamped sheet metal member for a required mechanical strength at a minimum cost.

If an additional reinforcement is required, the seat frame may additionally include a front cross member connecting front ends of the side members and extending in parallel with the restraint member.

Preferably, the seat member may be provided with a notch to facilitate deformation thereof when the restraint member is actuated. If desired, the seat member may be separated into a plurality of parts, and the device may be adapted to raise only one or two of such parts. Thereby, a favorable deformation of the seat member may be achieved, and the power requirement of the power actuator may be reduced.

To increase the support surface area of the restraint member, the restraint member may additionally comprise a plate member attached to a rod member at least over a part of length of the rod member, or a wire member attached to the rod member. If desired, the restraint member may be provided with an energy absorbing property through elastic or plastic deformations.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
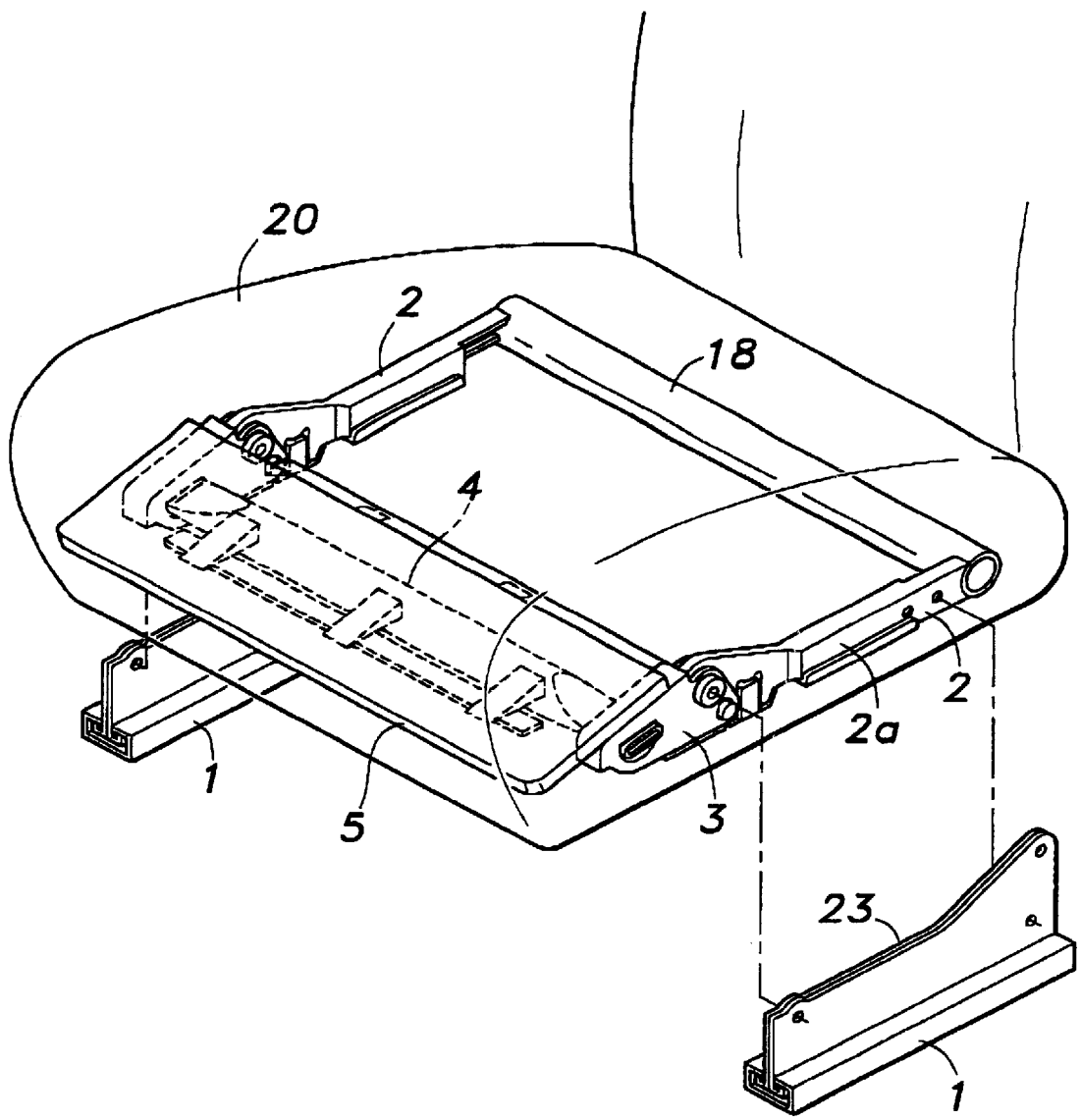
FIG. 1 is an exploded perspective view of an anti-submarine vehicle seat device embodying the present invention.
Figure 2:
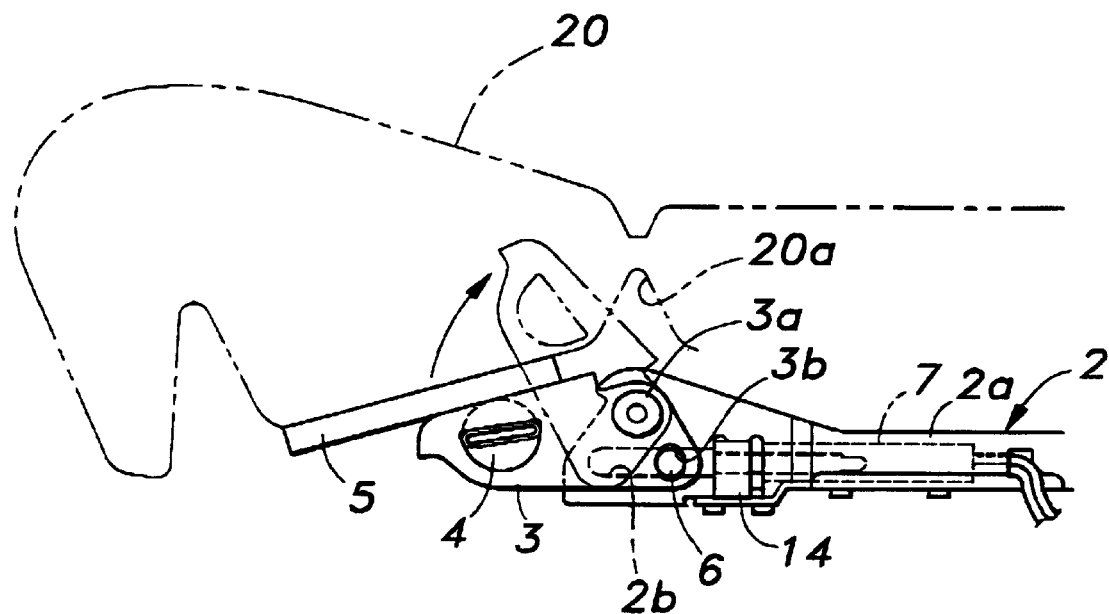
FIG. 2 is a fragmentary side view of the vehicle seat device of FIG. 1.

FIG. 1 is a perspective view of a vehicle seat device embodying the present invention, and FIG. 2 is a side view of this device. Seat rails 1 fixed to the vehicle body support a seat frame 2 so as to be slidable in the fore-and-aft direction via holders 23, and a seat adjustment mechanism not shown in the drawings allows the seat frame 2 to be secured at a desired position. A front part of the seat frame 2 rotatably supports, on either side thereof, a pair of arms 3 via a pivot pin 3*a*. These two arms 3 are firmly connected to each other by a pipe 4 extending laterally of the vehicle body, and serving as a restraint member as described hereinafter. The pipe 4 and the arms 3 support a panel member 5, so that the arms 3 and the panel member 5 may form additional parts of the restraint member.

The seat frame 2 includes a pair of tubular casings 2*a* each having a substantially closed, rectangular cross section extending longitudinally on either side, and a power actuator 7 which is described hereinafter is received in each of the casings 2*a*. The rear ends of the casings 2*a* are connected by a cross member 18. Therefore, the seat frame 2 consists of a closed rectangular frame.

The free end of a piston rod 9*b* of a piston assembly 9 in the power actuator 7 is connected to a pin 6 which is passed through a horizontally elongated guide slot 2*b* of the casing 2*a* and a vertically elongated slot 3*b* provided in a part of the arm 3 offset from the pivot pin 3*a*. The seat member 20 which may consist of hard urethane foam or any other suitable material is provided with a laterally extending notch 20*a* for facilitating deformation thereof.

Figure 3:
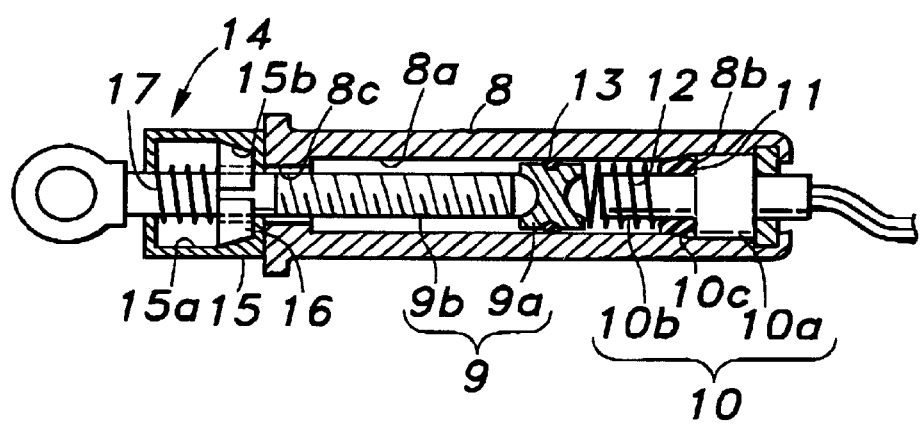
FIG. 3 is a sectional view of the power actuator of the vehicle seat device embodying the present invention.

Referring to FIG. 3, the power actuator 7 comprises a cylinder 8 which is received and fixed in the basing 2*a* of the seat frame 2, a piston main body 9*a* received in an inner bore 8*a* of the cylinder 8, and a gas generator 10 received in the part of the cylinder 8 more toward the base end thereof than the piston main body 9*a*. A compression coil spring 12 is interposed between the piston main body 9*a* and the gas generator 10 via a resilient seal member 11 to normally urge the piston main body 9*a* in the direction of activation (projecting direction). The seal member 11 may consist of any suitable kind such as an O-ring which has a resiliency in the axial direction, and is effective in preventing the leakage of generated gas.

The gas generator 10 comprises a large diameter portion 10*a* on the base end thereof, and a small diameter portion 10*b* on the front end thereof, and a shoulder 10*c* defined between these portions engages a corresponding shoulder 8*b* defined in the cylinder 8. The shoulder 10*c* of the gas generator 10 additionally serves as a seat for the compression coil spring 12 via the seal member 11. The compression coil spring 12 surrounds the small diameter portion 10*b* on the front end thereof in such a manner that a gap may be defined between the piston main body 9*a* and the front end of the small diameter portion 10*b* even when the compression coil spring 12 is fully compressed. Therefore, even when the piston main body 9*a* is subjected to an external force which would force it toward the gas generator 10, the piston main body 9*a* would not hit the front end of the small diameter portion 10*b* on the front end of the gas generator 10 so that the gas generator 10 is protected from damages and deformations.

The piston main body 9*a* engages the wall surface of the inner bore 8*a* via an O-ring 13. The piston assembly 9 is formed by the piston main body 9*a* and a piston rod 9*b* which abuts the piston mainbody 9*a* from the axial direction and is provided with a free end attached to the arm 3. The piston main body 9*a* and the piston rod 9*b* engage each other via a contact between a concentrically curved recess, and a corresponding concentrically curved projection having a somewhat smaller curvature so that the two parts are automatically aligned and the piston rod 9*b* would not tilt in the cylinder. Therefore, energy loss and gas leakage can be avoided. In practice, the surfaces are not necessarily required to be curved, but may also consist of tapered surfaces. In that case, the taper of the projection should be steeper than the taper of the recess.

As described earlier, the compression coil spring 12 normally urges the piston main body 9*a* in the direction of activation so that the piston rod 9*b* is also urged in the direction of activation, and the plays that may be present in the joint between the piston rod 9*b* and the arm 3 may be absorbed. The compression coil spring 12 may be substituted with a dish spring or a rubber-like elastomer member.

The open end 8*c* of the cylinder 8 on the working end is reduced in diameter by swaging so as to slidably engage the outer circumferential surface of the intermediate part of the piston rod 9*b*.

The front end of the power actuator 7 is provided with a one-way lock mechanism 14. The one-way lock mechanism 14 comprises a casing 15 surrounding the piston rod 9*b* and fixedly attached to the cylinder 8, and the casing 15 accommodates therein a plurality of engagement pieces 16, and a spring 17 urging the engagement pieces 16 toward the base end of the piston rod 9*b* or the cylinder 8. Each of the engagement pieces 16 is gradually reduced in outer diameter from the free end of the piston rod 9*b* to the base end thereof. The inner bore of the casing 15 includes a large diameter portion 15*a* and a tapered portion 15*b* which is gradually reduced in inner diameter away from the large diameter portion 15*a*. Therefore, in the illustrated state, the engagement pieces 16 are pressed onto the tapered portion 15*b* and engage the outer circumferential surface of the piston rod 9*b* under the biasing force of the spring 17. As the piston rod 9*b* moves in the projecting direction, the engagement pieces 16 are dragged in the projecting direction of the piston rod 9*b* against the spring force of the spring 17. As they move toward the large diameter portion 15*a*, they move away from the piston rod 9*b* so that the piston rod 9*b* is allowed to move freely. When the piston rod 9*b* is pushed back into the cylinder 8, the engagement pieces 16 move toward the tapered portion 15*b* under the spring force of the spring 17 and engage the outer circumferential surface of the piston rod 9*b* so that the piston assembly 9 is securely fixed relative to the cylinder 8. The inner circumferential surface of each of the engagement pieces 16 is provided with annular grooves or thread grooves while the outer circumferential surface of the piston rod 9*b* is provided with corresponding annular grooves or thread grooves. Therefore, as the piston rod 9*b* is pushed into the cylinder 8, the inner circumferential surfaces of the engagement pieces 16 engage the outer circumferential surface of the piston rod 9*b* so that these two parts are firmly retained to each other, and are kept at a fixed position.

The cylinder 8 is installed and fixedly secured in the casing 2*a*, and the piston rod 9*b* is introduced from the open working end 8*c* of the cylinder 8. The free end of the piston rod 9*b* is then connected to the arm 3 by the pin 6. The anti-submarine device is thus formed by the casings 2*a*, the power actuator 7, the restraint member consisting of the arms 3, the pie 4 and the panel member 5, the impact sensor consisting of an acceleration sensor or the like not shown in the drawing, and a control unit also not shown in the drawing.

When installing the device in a seat during the assembly work, and welding is required to be performed, the power actuator incorporated with a propellant is installed after completing the welding process. The seat frame 2 was supported by the seat rails 1 via the slidable holders in the above described embodiment, but may be attached to mounting brackets in case of a tiltable and/or liftable seat.

Now the mode of operation of this embodiment is described in the following. First of all, when a vehicle crash is detected by a deceleration sensor not shown in the drawing, gas is generated from the gas generator 10, and the resulting rapid increase in the inner pressure of the cylinder 8 instantaneously pushes out the free end of the piston assembly 9 from the cylinder 8. As a result, the arm 5 attached to the free end of the piston rod 9b turns in clockwise direction as indicated by the imaginary lines in FIG. 2, and the restraint member consisting of the pipe 4 and the panel member 5 is raised along with the corresponding part of the seat so that the submarining of the vehicle occupant can be prevented. Because an intermediate part of the seat cushion 20 has a relative small thickness or is provided with the notch 20a, the seat cushion 20 would not excessively resist the lifting of the seat by the restraint member. In practice, it is also possible to form the part of the seat that can be raised by the restraint member from a separate member. Further, by using an elastic or otherwise readily deformable material in a selected part of the surface skin member of the seat, the resistance to the raising motion of the seat can be even further reduced.

Even after the generation of gas from the gas generator 10 has ceased, and the drive force of the power actuator 7 has been lost, the raised slip preventing member would not come down, and maintains the action to prevent submarining of the seat's occupant.

The one-way lock mechanism may be provided only on one side of the seat, but a higher mechanical strength can be achieved if two of them are arranged on either side of the seat to support the load of the vehicle occupant from both sides. In this case, two one-way lock mechanisms having different constructions may be arranged on either side. For instance, the above described one-way lock mechanism may be provided on one side while a ball-type one-way lock mechanism capable of locking at any desire position is provided on the other side. When two power actuators are used on either side of the seat, each of the power actuators may consist of a relatively small device so that any localized increase in the size of the device can be avoided by proper distribution of compact devices.

Figure 4:
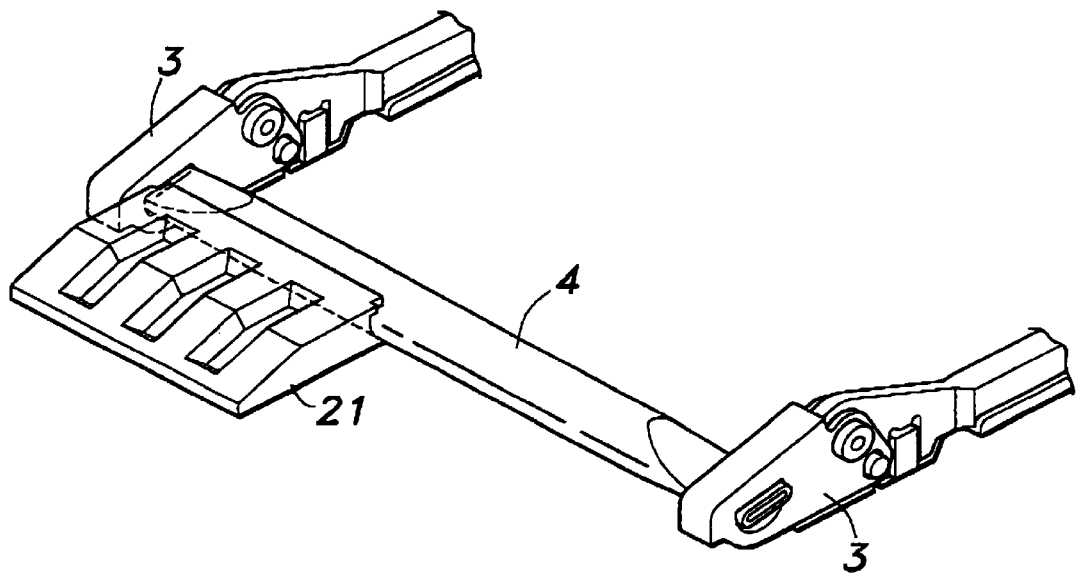
FIG. 4 is a fragmentary perspective view showing a modified embodiment of the vehicle seat device of the present invention.

FIG. 4 is a perspective view of a modified embodiment of the vehicle seat device according to the present invention, showing only the restraint member. In this embodiment, to raise the leg of the vehicle occupant near the door, the panel member 21 is provided only over one half the length of the pipe 4. This is based on the recognition that the leg which is relatively stretched for stepping on the pedal is desired to be particularly protected in the case of an offset crash which causes a relatively large deformation on the associated side part of the vehicle body. Furthermore, when the panel member is provided only over one half the length of the pipe, because the lifting area is smaller than having the panel member extend over the entire length of the pipe, the force required to raise the panel member is substantially reduced so that the required size of the power actuator can be reduced, and the component parts may have smaller thicknesses and masses. If the panel member is provided only over one half the length of the pipe, and inclined upward from inside to outside, it is possible to raise the outer leg of the vehicle occupant both upward and inward.

The submarine preventing device of the present invention can be adapted for different kinds and sizes of the vehicles, and the positions of the seats. For instance, when the panel member is provided substantially over the entire length of the pipe 4, and the central part of the panel member projects higher than the remaining part of the panel member, the legs of the vehicle occupant can be raised while keeping them wide apart in case of a vehicle crash so that the interference with the steering handle can be avoided. A similar result can be achieved if the panel member is inclined downward from inside to outside.

Figure 5:
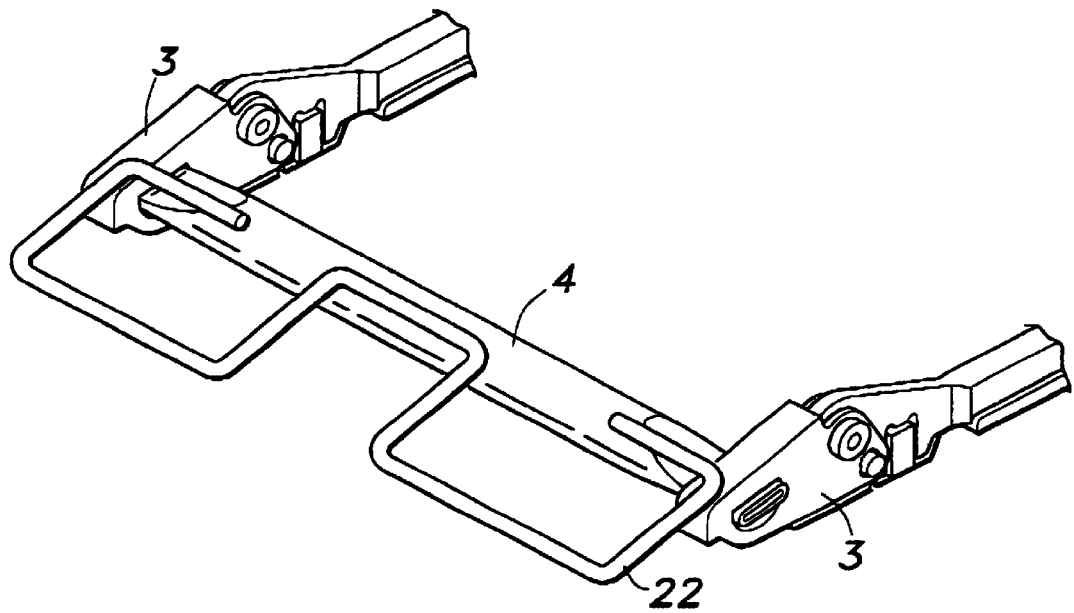
FIG. 5 is a view similar to FIG. 4 showing another modified embodiment of the vehicle seat device of the present invention.

FIG. 5 is a perspective view of another modified embodiment of the vehicle seat device according to the present invention, showing only the restraint member. In this embodiment, a wire frame 22 made of a wire member is provided substantially over the entire length of the pipe 4, instead of the panel member, and the weight of the restraint member is thereby reduced. This embodiment is otherwise similar to the previous embodiments.

Figure 6:
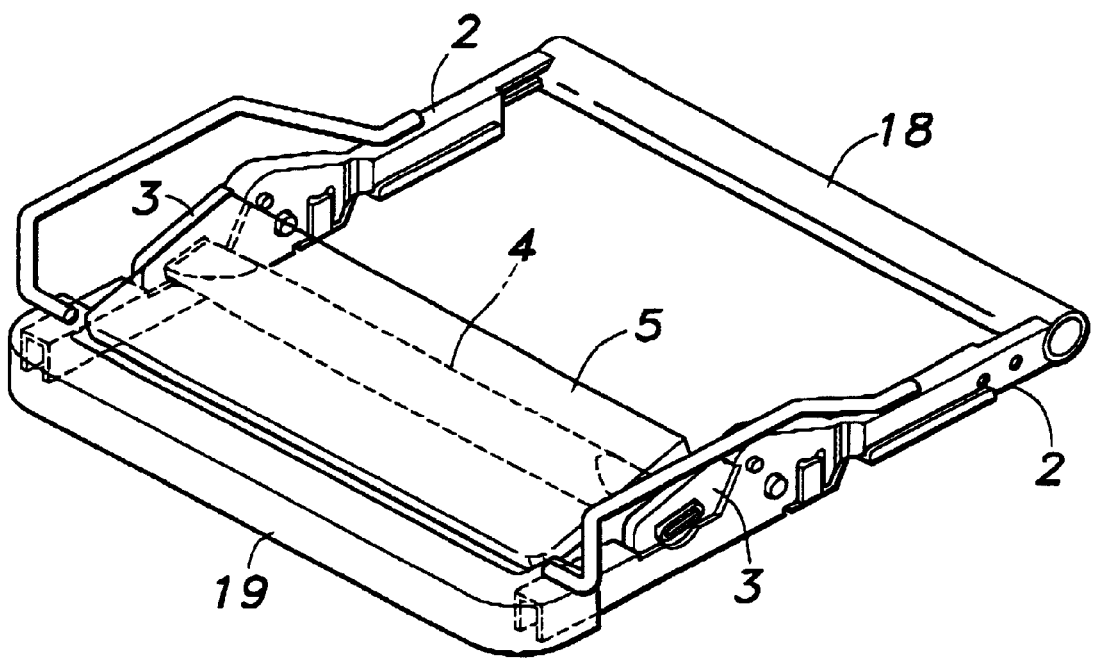
FIG. 6 is a perspective view showing yet another modified embodiment of the vehicle seat device of the present invention.

FIG. 6 is a perspective view of yet another modified embodiment of the vehicle seat device according to the present invention, showing only the restraint member. In this embodiment, not only the rear parts of the casings 2a or the longitudinal members are joined together by the cross member 18, but also the front parts of the casings 2a are joined together by another cross member 19. Thereby, the seat frame 2 is further reinforce. This embodiment is otherwise similar to the previous embodiments.

As can be appreciated from the foregoing description, according to a certain aspect of the present invention, the anti-submarine vehicle seat device for raising a seat cushion to prevent a vehicle occupant from slipping forward under a seat belt in an impact situation such as a vehicle crash comprises a restraint member moveably supported by a casing which is in turn integrally attached to a seat frame, and the casing and/or the restraint member form a part of the seat frame. By using the structural member of the anti-submarine device as a part of the seat frame, the number of component parts of the seat device, as well as the size and weight of the device, can be reduced.

Although the present invention has been described in terms of preferred embodiments thereof, it is obvious to a person skilled in the art that various alterations and modifications are possible without departing from the scope of the present invention which is set forth in the appended claims.

What is claimed is:

1. A vehicle seat device for raising a front part of a seat member to prevent a vehicle occupant from slipping forward under a seat belt in an impact situation including a vehicle crash, comprising:

a fixed casing;

a vehicle occupant restraint member supported by said casing so as to be moveable between a rest position and a deployed position; and a power actuator supported by said casing for selectively driving said restraint member toward said deployed position;

said fixed casing including a pair of side members each having a front end pivotally supporting said restraint member, and a rear cross member extending across rear parts of said side members, said restraint member extending across front ends of said side members.

2. A vehicle seat device according to claim 1, wherein said vehicle occupant restraint member being a sole structural member extending across front parts of said side members.

3. A vehicle seat device according to claim 1, wherein said seat frame additionally includes a front cross member connecting front ends of said side members and extending in parallel with said restraint member.

4. A vehicle seat device according to claim 1, wherein said seat member is provided with a notch to facilitate deformation thereof when said restraint member is actuated.

5. A vehicle seat device according to claim 1, wherein said restraint member comprises a rod member.

6. A vehicle device according to claim 5, wherein said restraint member additionally comprises a plate member attached to said rod member at least over a part of length of said rod member.

7. A vehicle seat device according to claim 5, wherein said restraint member additionally comprises a wire member attached to said rod member.

8. A vehicle seat device for raising a front part of a seat member to prevent a vehicle occupant from slipping forward under a seat belt in an impact situation including a vehicle crash, comprising:

a fixed casing including a pair of side members extending in a for-and-aft direction of the vehicle on either side of said seat device, and a cross member extending across rear ends of said side members;

a vehicle occupant restraint member supported by and extending laterally across said side members so as to be moveable between a rest position and a deployed position; and a power actuator supported by said casing for selectively driving said restraint member toward said deployed position;

said vehicle occupant restraint member being a sole structural member extending across front parts of said side members.

* * * * *